May 20, 1930. J. L. DRAKE 1,759,229
METHOD AND APPARATUS FOR DRAWING SHEET GLASS
Filed Feb. 1, 1928
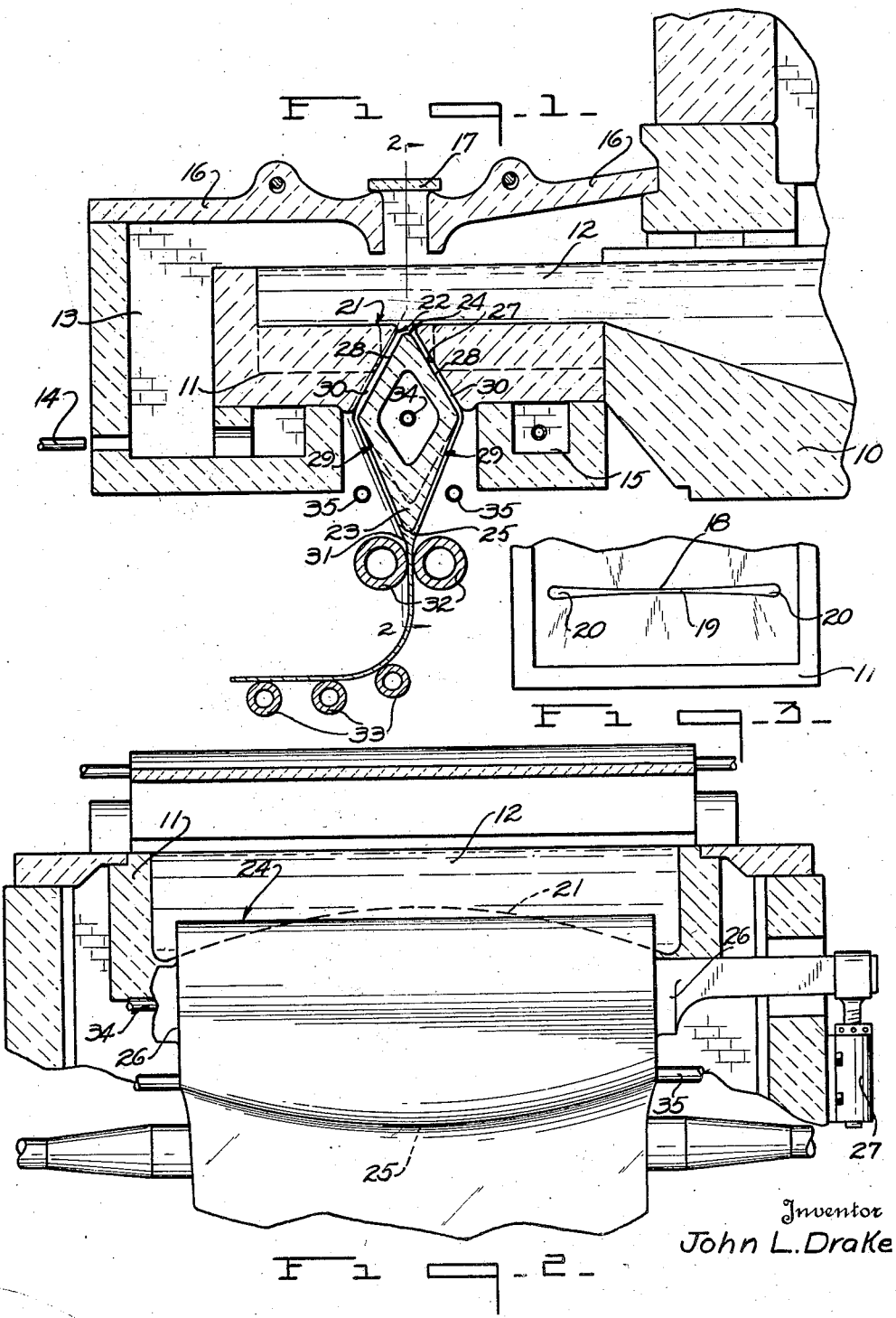
Inventor
John L. Drake
By Frank Fraser
Attorney Patented May 20, 1930

1,759,229

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

METHOD AND APPARATUS FOR DRAWING SHEET GLASS

Application filed February 1, 1928. Serial No. 251,086.

This invention relates to a method and apparatus for drawing sheet glass.

The invention has as one of its primary objects to provide a process and apparatus for drawing sheet glass wherein a sheet of uniform thickness may be continuously drawn.

Still another object of the invention is to provide a process and apparatus of this nature wherein molten glass in a relatively non-uniform condition in a pot may be flowed downwardly in engagement with means for restoring the glass to a uniform temperature and then formed into a sheet of substantially predetermined thickness.

Another object of this invention is to provide a method and apparatus of the character described wherein the glass is flowed downwardly from a working receptacle on the opposed faces of a flow slab whereupon the streams of molten glass are so controlled that when they are subsequently united a sheet of uniform dimensions is obtained.

Still another object of this invention is to provide a method and apparatus of the class described wherein the flow slab is adjustable to control the thickness of the streams of molten glass and further adjustable to positively shut off the flow of molten glass.

Still another object of this invention is to provide a method and apparatus of this nature wherein the molten glass is flowed downwardly through a slot in the bottom of the working receptacle and in engagement with a flow slab, said slot and slab being co-operatively shaped and functioning jointly to control the flow of the molten glass whereupon a sheet of uniform character may be continuously produced.

Many other objects, advantages and novel details of construction of the present invention will be made more apparent as this description proceeds, especially when considered in connection with the accompanying drawings wherein:

Figure 1 is a fragmentary vertical longitudinal sectional view through the refining end of a tank furnace with my invention applied thereto.

Figure 2 is a vertical transverse sectional view taken substantially on the plane indicated by line 2—2 in Figure 1, and Figure 3 is a fragmentary plan view of the working receptacle.

Referring now to the drawings wherein like reference characters indicate like parts it will be seen that there is fragmentarily illustrated a continuous tank furnace 10 provided with a working receptacle 11 adapted to contain a mass of molten glass 12. The working receptacle is enclosed in a chamber 13 the temperature of which may be controlled in any desired or suitable manner as, for instance, by means of burners 14. Heating compartments 15 are arranged under the working receptacle whereby the contents of this receptacle may be kept in a workable plastic condition. The top of the chamber 13 is closed by lip tiles 16 and a cover tile 17.

Molten glass 12 flows downwardly from working receptacle 11 through a slot 18 which is formed with a relatively narrow center portion 19 and relatively wider end portions 20. The slot is formed in the bottom of the working receptacle 11 and extends transversely thereof and for purposes which will appear more fully hereinafter the bottom 21 of the working receptacle is transversely curved or bowed upwardly as indicated. Thus the pool of molten glass 12 is of varying depth transversely of the working receptacle thus providing a relatively shallow pool adjacent the center of the working receptacle and a relatively deeper pool adjacent the sides thereof.

The slot 18 has its side walls 22 thereof tapering outwardly or diverging as most clearly illustrated in Figure 1 and co-operating with slot 18 and located partially therein is a flow slab 23. This slab is substantially double wedge-shaped in cross section, also as most clearly illustrated in Figure 1 and substantially the upper longitudinal half of the slab is located or positioned within the slot 18. The upper longitudinal edge 24 of slab 23 is straight or in other words parallel with the longitudinal axis of the slab whereas the lower longitudinal edge 25 is curved or bowed downwardly as most clearly illustrated in Figure 2. The slab 23, by reason of its straight or parallel upper edge 24 projects upwardly beyond the top surface of the bottom 21 at the ends thereof but is located slightly below the top surface of the bottom at its center parts.

Extensions 26 of the slab 23 are adjustably supported by means indicated generally by the reference character 27 whereby by this or any other desired means slab 23 may be vertically adjusted.

The double wedge-shape slab 23 provides a pair of downwardly diverging faces or walls 28 and a pair of converging walls or faces 29. The walls 28 co-operate with the side walls 22 of the slot 18 to create passageways through which relatively narrow streams of glass 30 may flow. This glass, in its continued downward flow, flows along the surfaces 29, which as shown, converge in a downward direction whereupon the two streams unite below the slab in a single stream or sheet 31. The two streams 30 of the molten glass cling to the faces 29 of the slab by reason of the natural tendency of molten glass to adhere to refractory material or non-corrosive alloys such as nichrome or the like of which slab 23 may be made. The united streams or sheet 31 is then passed between sizing rolls 32 and then directed laterally in a horizontal plane onto conveying and supporting rolls 33. Slab 23 may be, and preferably is, made hollow and the temperature thereof may be controlled in any desired manner, as for instance, by passing a temperature control medium therethrough by means of conduit 34. Other temperature control means 35, of any desired character, may be arranged externally of the slab 23 to control the temperature of the streams of molten glass passing along the surfaces thereof.

By constructing the slot 28 as shown, that is, with its center portion relatively narrow and its end portions relatively wide, means for controlling the flow of the molten glass and for obtaining a substantially uniform flow is provided. Obviously the glass adjacent the sides of the receptacle is colder than that in the center of the pot and furthermore the glass flowing into the edge portions ordinarily cools more rapidly so that the glass flowing into the edge portions of the sheet flows relatively more slowly. Therefore by restricting the flow of glass by making the slot relatively narrower at the center and permitting a freer flow by widening the slots at the ends thereof a substantially uniform stream of glass is permitted to flow downwardly into engagement with the flow slab 23. In a further effort to obtain uniformity in the flow of the molten glass and in the subsequent formation of the sheet the lower edge 25 of the flow slab is curved or extended downwardly as previously mentioned and as most clearly illustrated in Figure 2. Thus the vertical width of the slab 23 is greater at its center than at any other point, this vertical dimension gradually diminishing towards the ends of the slab. The natural tendency of the molten glass to adhere to the slab operates to create a drag upon the flow of the streams of glass and by making the slab wider at its center then at its ends that glass flowing into the center portion of the sheet is subjected to this dragging or retarding action for a longer period of time than that glass flowing into the edge portions of the sheet. This, therefore, acts to retard or slow up the glass comprising the center of the sheet and to relatively speed up the glass flowing into or comprising the edge portions of the sheet. As was previously pointed out the condition of the glass in the working receptacle is frequently non-uniform, particularly as regards temperature. However, by flowing this glass downwardly through the slot 18 and subject to the control thereof and in engagement with the surfaces of the slab 23 and subject to the control thereof and subject further to the temperature control means 34 and 35 a uniformity of temperature is established in these streams of molten glass so that a glass sheet of predetermined dimensions and of a uniform character may be produced.

By adjusting flow slab 23 vertically with respect to slot 18 the thickness of the streams of molten glass 30 may be varied to thus vary the thickness of the united streams or sheet 31. Furthermore flow slab 23 may be so adjusted as to completely close slot 18 to thus shut off the flow of molten glass as will be apparent.

While an embodiment of this invention has been illustrated and described herein somewhat in detail it will be readily apparent to those skilled in this art that various changes, re-arrangements and modifications may be resorted to without departing from the spirit and scope of this invention and to this end reservation is made to make such changes as may come within the purview of the accompanying claims.

I claim:

1. Apparatus for making sheet glass including, a tank furnace having a slot in the bottom of its working receptacle, said slot being of variable width longitudinally and a flow slab co-operating with said slot, as and for the purposes set forth.

2. Sheet glass apparatus including in combination, a working receptacle provided with an elongated slot in its bottom, said slot being longitudinally shaped to provide a relatively freer flow of molten glass through its end portions than through its center portion and a flow slab extending into said slot and co-operating therewith to direct the molten glass into two streams which unite therebelow into a single stream.

3. Sheet glass apparatus including in combination, a working receptacle provided with an elongated slot in its bottom, said slot being longitudnally shaped to provide a relatively freer flow of molten glass through its end portions than through its center portion and a flow slab extending into said slot and co-operating therewith to direct the molten glass into two streams which unite therebelow into a single stream and means for reducing the united streams to sheet form.

4. Sheet glass apparatus including in combination, a working receptacle provided with an elongated slot in its bottom, said slot being longitudinally shaped to provide a relatively freer flow of molten glass through its end portions than through its center portion and a flow slab extending into said slot and co-operating therewith to direct the molten glass into two streams which unite therebelow into a single stream and means for adjusting said flow slab to regulate said streams of molten glass or for cutting off the flow of said molten glass through said slot.

5. Sheet glass apparatus including in combination, a working receptacle provided with an upwardly bowed bottom having an elongated slot formed therein, said slot being formed with relatively wider end portions and with inclined downwardly diverging side walls and a flow slab extending into said slot and shaped to co-operate therewith to create a pair of downwardly diverging passages through which two relatively thin streams of molten glass are adapted to flow, said slab being also formed with converging surfaces whereby said streams of molten glass unite into a single stream.

6. Sheet glass apparatus including in combination, a working receptacle provided with an upwardly bowed bottom having an elongated slot formed therein, said slot being formed with relatively wider end portions and with inclined downwardly diverging side walls and a flow slab double wedge shape in cross section extending into said slot and co-operating therewith to create a pair of downwardly diverging passages through which two relatively thin streams of molten glass are adapted to flow, said streams uniting adjacent the lower edge of said slab into a single stream.

7. Sheet glass apparatus including in combination, a working receptacle provided with an upwardly curved bottom having an elongated slot formed therein, said slot being formed with relatively wider end portions and with inclined downwardly diverging side walls and a flow slab double wedge shape in cross section extending into said slot and co-operating therewith to create a pair of downwardly diverging passages through which two relatively thin streams of molten glass are adapted to flow, said streams uniting adjacent the lower edge of said slab into a single stream, the vertical width of said slab varying longitudinally whereby a relatively greater drag is imposed upon the glass at the center of said streams than at the edge portions thereof, said streams uniting adjacent the lower edge of said slab and means for drawing the united streams away in sheet form.

8. Apparatus for making sheet glass, including a working receptacle having an elongated slot in the bottom thereof, said slot being narrower at its center than at its ends, and a flow slab projecting into said slot and cooperating therewith to control the flow of molten glass therethrough.

9. Apparatus for making sheet glass, including a working receptacle provided with an upwardly bowed bottom having an elongated slot formed therein, said slot being of variable width longitudinally, and a flow slab cooperating with said slot to control the flow of molten glass therethrough.

10. Apparatus for making sheet glass, including a working receptacle provided with an upwardly curved bottom having an elongated slot formed therein, said slot being narrower at its center than at its ends, and a flow slab projecting into said slot and cooperating therewith to control the flow of molten glass therethrough.

11. Apparatus for making sheet glass, including a working receptacle having an elongated slot in the bottom thereof, said slot being of variable width longitudinally and formed with inclined downwardly diverging side walls, and a flow slab extending into said slot and shaped to cooperate therewith to control the flow of molten glass therethrough.

12. Apparatus for making sheet glass, including a working receptacle having an elongated slot in the bottom thereof, said slot being narrower at its center than at its ends and provided with inclined downwardly diverging side walls, and a flow slab projecting into said slot and shaped to cooperate therewith to control the flow of glass therethrough.

13. In the method of forming sheet glass, those steps consisting in establishing a pool of molten glass in a container, flowing the glass downwardly from said pool in the form of two relatively wide spaced streams, effecting a relatively freer downward flow of the glass adjacent the edge and border portions of the streams than at their centers, and in subsequently uniting the streams to form a single sheet.

14. In the method of forming sheet glass, those steps consisting in establishing a pool of molten glass in a container, flowing the glass downwardly from said pool in the form of two relatively wide spaced streams, continuing downward movement of the streams in spaced relation over stationary directing surfaces, effecting a relatively freer downward flow of the glass from the pool adjacent the edge and border portions of the streams than at their centers, retarding the flow of the central portions of the streams while on said directing surfaces to a greater extent than the edge and border portions thereof, and in subsequently uniting the streams to form a single sheet.

15. In the method of forming sheet glass, those steps consisting in establishing a pool of molten glass which is relatively shallow at its center and relatively deeper adjacent the sides thereof, flowing glass downwardly from the pool in the form of two relatively wide spaced streams, the central portions of the streams being in line with the relatively shallow portion of the pool and the edge and border portions of the streams substantially in line with the relatively deeper portions of the pool, and in subsequently uniting streams to form a single sheet.

16. In the method of forming sheet glass, those steps consisting in establishing a pool of molten glass which is relatively shallow at its center and relatively deeper adjacent the sides thereof, flowing glass downwardly from said pool in the form of two relatively wide spaced streams, the central portions of the streams being supplied with glass from the central shallow portion of the pool and the end portions of the streams supplied with glass from the relatively deeper side portions thereof, retarding the flow of the central portions of the streams to a greater degree than the edge and border portions thereof, and in subsequently uniting the streams to form a single sheet.

17. In the method of forming sheet glass, those steps consisting in establishing a pool of molten glass which is relatively shallow at its center and relatively deeper adjacent the sides thereof, flowing glass downwardly from said pool in the form of two relatively wide spaced streams, the central portions of the streams being in line with the relatively shallow portion of the pool and the edge and border portions of the streams substantially in line with the relatively deeper portions of the pool, effecting a relatively freer downward flow of the molten glass adjacent the relatively deeper portions of the pool than at the relatively shallow portion thereof, and in subsequently uniting the streams to form a single sheet.

18. In the method of forming sheet glass, those steps consisting in establishing a pool of molten glass which is relatively shallow at its center and relatively deeper adjacent the sides thereof, flowing glass downwardly from said pool in the form of two relatively wide spaced streams, the central portions of the streams being in line with the relatively shallow portion of the pool and the edge and border portions of the streams substantially in line with the relatively deeper portions of the pool, effecting a relatively freer downward flow of the molten glass from the pool adjacent the relatively deeper portions thereof than at the relatively shallow portion, continuing downward movement of the streams in spaced relation over stationary directing surfaces, retarding the flow of the central portions of the streams while on said surfaces to a greater extent than the edge and border portions thereof, and in subsequently uniting the streams to form a single sheet.

Signed at Toledo, in the county of Lucas and State of Ohio, this 28th day of January, 1928.

JOHN L. DRAKE.